(12) United States Patent
Rhoads (10) Patent No.: US 7,656,565 B2
(45) Date of Patent: *Feb. 2, 2010

(54) EXPLOITING RANDOM MOTION DURING SCANNING TO YIELD IMPROVED IMAGE

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 1139 days.

This patent is subject to a terminal disclaimer.

(21) Appl. No.: 10/678,584

(22) Filed: Oct. 3, 2003

(65) Prior Publication Data

US 2004/0130758 A1    Jul. 8, 2004

Related U.S. Application Data

(63) Continuation of application No. 09/930,603, filed on Aug. 15, 2001, now Pat. No. 6,631,015, which is a continuation of application No. 09/099,864, filed on Jun. 18, 1998, now Pat. No. 6,320,680.

(51) Int. Cl.
    *H04N 1/04* (2006.01)
(52) U.S. Cl. ............ 358/497; 358/474; 358/444; 358/483; 358/486
(58) Field of Classification Search ............ 358/463, 358/474, 497, 486, 444, 483, 482, 445, 443; 250/208.1, 216, 234–236; 348/219.1; 382/312, 382/275
    See application file for complete search history.

(56) References Cited

U.S. PATENT DOCUMENTS 4,326,147 A    4/1982    Nakayama 4,336,558 A    6/1982    Lew (Continued)

OTHER PUBLICATIONS

Borman et al, "Spatial Resolution Enhancement of Low-Resolution Image Sequences—A Comprehensive Review With Directions For Future Research," Tech. Report, University of Notre Dame, 1998, 64 pp.

(Continued)

*Primary Examiner*—Cheukfan Lee (57) ABSTRACT

An additional motion is introduced into a scanning operation. This additional motion is in addition to the motion that is inherent in any document scanning operation. For example, in a flatbed scanner a linear array of scanning devices is positioned across the document in a first or "x" direction and this array is moved across the document in a perpendicular or "y" direction. In a flatbed scanner the position of the scanning devices are fixed in the "x" direction. In a drum scanner a light beam moves across the document in an "x" direction and the document is moved in the "y" direction. The light reflected from the document is directed to a fixed photoreceptor. With the present invention an additional vibratory motion is introduced into the scanning process. With a flatbed scanner the array of detector devices is moved or vibrated. The vibratory motion can for example be in the "x" direction. With a drum scanner the photoreceptor is moved or vibrated. For example the photodetector can be moved or vibrated in the "x" direction. The amount and direction of the vibratory movement can vary up to about one half the distance between units in the scanner's resolution (i.e. one half a pixel). If one is trying to eliminate Moire patterns the vibratory movement can be a pseudo random series of movements. If one is trying to introduce a special pattern into the document or to otherwise create special effects, various other type of motion can be used. Movement of the CCD array in a flatbed scanner or movement of the photoreceptor in a drum scanner can be done by a simple piezo electric transducer or by a simple mechanical cam.

17 Claims, 5 Drawing Sheets

U.S. PATENT DOCUMENTS

| | | |
|---|---|---|
| 4,468,706 A | 8/1984 | Cahill |
| 4,516,175 A | 5/1985 | Jung |
| 4,613,896 A | 9/1986 | Takita |
| 4,689,514 A | 8/1987 | Kondoh |
| 4,743,927 A | 5/1988 | Sasaki |
| 4,965,599 A | 10/1990 | Roddy |
| 5,069,530 A | 12/1991 | Nishida |
| 5,121,213 A | 6/1992 | Nishioka |
| 5,335,091 A | 8/1994 | Palum |
| 5,374,976 A | 12/1994 | Spannenburg |
| 5,396,142 A | 3/1995 | Koblanski |
| 5,489,994 A | 2/1996 | Torok |
| 5,541,741 A | 7/1996 | Suzuki |
| 5,726,779 A | 3/1998 | Kadowaki et al. |
| 5,748,223 A | 5/1998 | Ito |
| 5,751,444 A | 5/1998 | Ward |
| 5,767,987 A | 6/1998 | Wolff et al. |
| 5,786,901 A | 7/1998 | Okada |
| 5,859,928 A | 1/1999 | Noh |
| 6,115,147 A | 9/2000 | Mizumoto et al. |
| 6,240,219 B1 | 5/2001 | Gregory |
| 6,320,680 B1 * | 11/2001 | Rhoads ........................ 358/497 |
| 6,466,253 B1 | 10/2002 | Honjoh |
| 6,631,015 B2 * | 10/2003 | Rhoads ........................ 358/497 |

OTHER PUBLICATIONS

Elad et al, "Restoration of a Single Superresolution Image from Several Blurred, Noisy, and Undersampled Measured Images," IEEE Trans. On Image Processing, vol. 6, No. 12, Dec. 1997, pp. 1646-1658.

Eren et al, "Robust, Object-Based High-Resolution Image Reconstruction From Low-Resolution Video," IEEE Trans. on Image Processing, vol. 6, No. 10, Oct. 1997, pp. 1446-1451.

Irani et al, "Improving Resolution by Image Registration," CVGIP: Graphical Models and Image Processing, vol. 53, No. 3, May 1993, pp. 231-239.

Schultz et al, "Extraction of High-Resolution Frames from Video Sequences," IEEE Trans. on Image Processing, 5(6), pp. 996-1011, 1996.

* cited by examiner

EXPLOITING RANDOM MOTION DURING SCANNING TO YIELD IMPROVED IMAGE

RELATED APPLICATION DATA

This application is a continuation of application Ser. No. 09/930,603, filed Aug. 1, 2001 (U.S. Pat. No. 6,631,015), which is a continuation of application Ser. No. 09/099,864, filed Jun. 18, 1998 (U.S. Pat. No. 6,320,680).

FIELD OF THE INVENTION

The present invention relates to document scanning, and more particularly relates to use of slight motion during scanning to enhance an aspect of the scanned data.

BACKGROUND OF THE INVENTION

Existing document scanners can generally be classified as either flatbed scanners or drum scanners. Flatbed scanners generally have a linear array of detecting devices such as linear charge coupled devices (CCDs). The space between the detecting devices determines the horizontal resolution of the scanning device. The speed that the array is moved along the document and the rate at which the devices are read, determines the vertical resolution of the scanning device. Flatbed scanning devices which have 300 to 600 CCD elements per inch are commercially available.

Drum scanners generally have a single photo-detector and a scanning beam of light. The beam of light scans across a line of the document as the document moves around the drum. The light reflected from the document is directed to the single photodetector. The horizontal resolution of the scanner is primarily determined by the frequency that the output of the single photoreceptor is sampled as the light beam moves across a line of the document.

Drum scanners can also include a linear array of detectors and there are many other types of scanners which combine elements from the above described two general types of scanners.

Scanning a document at a particular resolution (for example at 600 pixels per inch) can introduce patterns into the data. The patterns introduced into data by scanning appear when the scanned data is printed or displayed. Such patterns are frequently referred to as Moiré patterns.

In some instances special patterns are intentionally introduced into an image so that when the image is scanned and then reproduced the Moiré patterns produce visible images. When such images are visible it indicates that a document is not an original, that is, the image was created by scanning an original. Such technology is well developed and is for example described in issued U.S. Pat. No. 5,735,547.

The present invention is directed to a method and apparatus for scanning a document in a manner which changes how and whether Moiré patterns are introduced into an image when the image is scanned.

SUMMARY OF THE INVENTION

With the present invention an additional motion is introduced into the scanning operation. This additional motion introduced by the present invention is in addition to the motion that is inherent in any document scanning operation. For example, in a flatbed scanner a linear array of scanning devices is positioned across the document in a first or "x" direction and this array is moved across the document in a perpendicular or "y" direction. In a flatbed scanner the position of the scanning devices are fixed in the "x" direction. In a drum scanner a light beam moves across the document in an "x" direction and the document is moved in the "y" direction. The light reflected from the document is directed to a fixed photoreceptor. With the present invention an additional vibratory motion is introduced into the scanning process. With a flatbed scanner the array of detector devices is moved or vibrated. The vibratory motion can for example be in the "x" direction. With a drum scanner the photoreceptor is moved or vibrated. For example the photodetector can be moved or vibrated in the "x" direction. The amount and direction of the vibratory movement can vary up to about one half the distance between units in the scanner's resolution (i.e. one half a pixel). If one is trying to eliminate Moiré patterns the vibratory movement can be a pseudo random series of movements. If one is trying to introduce a special pattern into the document or to otherwise create special effects, various other type of motion can be used. Movement of the CCD array in a flatbed scanner or movement of the photoreceptor in a drum scanner can be done by a simple piezo electric transducer or by a simple mechanical cam.

With the present invention, the data generated by the vibrated scanning device can be manipulated to generate a digital image similar to that which would be generated by a normal scanning element, except that the digital image so generated does not contain the majority of the Moiré patterns that would have been generated by a normal scanning element. The data from the vibrated scanning element can also be manipulated to enhance certain desired effects. That is, the present invention can be used to enhance patterns that are intentionally placed in an image. For example, an image can be constructed so that it will contain a pattern that will only be visible if the image is scanned with a scanner which is operating in accordance with the present invention.

DETAILED DESCRIPTION

Figure 1:
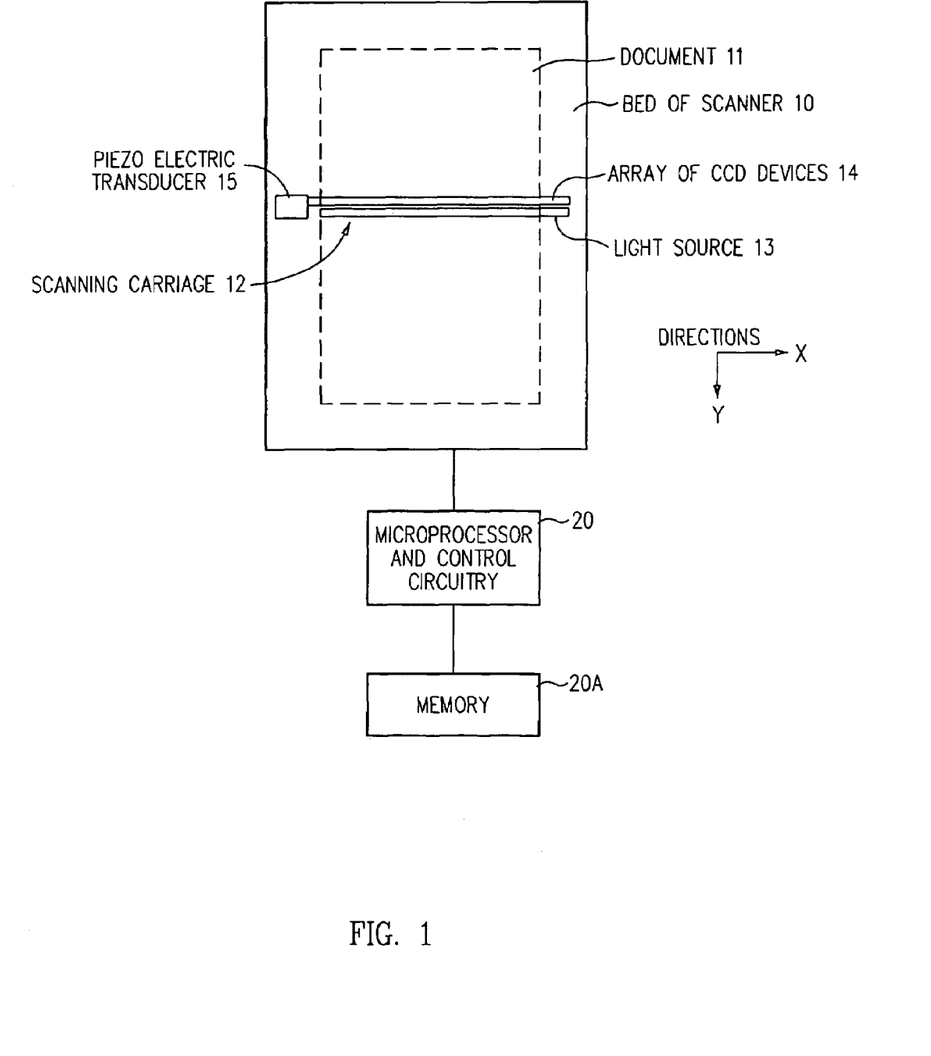
FIG. 1 is an overall diagram of a scanning system which utilizes the present invention.

An overall diagram illustrating the present invention applied to a flatbed scanner is shown in FIG. 1. The scanner shown in FIG. 1 has a scanner bed 10 on which is position a document 11. A moveable scanning carriage 12 contains a light source 13 and a linear array of charge coupled devices (CCDs) 14. A line on the document 11 is illuminated by LED light source 13. An image of the illuminated line is focused on CCD detector array 14 by a lens (not explicitly shown). The array 14 is moved across the document in the y direction (by a conventional mechanical mechanism which is not explicitly shown in the drawing). A microprocessor 20 controls the operation of the entire system and signals from the CCD array 14 are stored in memory 20A. As the system scans a document 11 the signals from array 14 creates a digital image of the document in micro-processor memory 20A. All of the above elements are conventional and they are found in many commercially available flatbed scanners. The present invention involves transducer 15 which is positioned at the end of array 14 and which will be described later with reference to FIGS. 2A and 2B.

Figure 3:
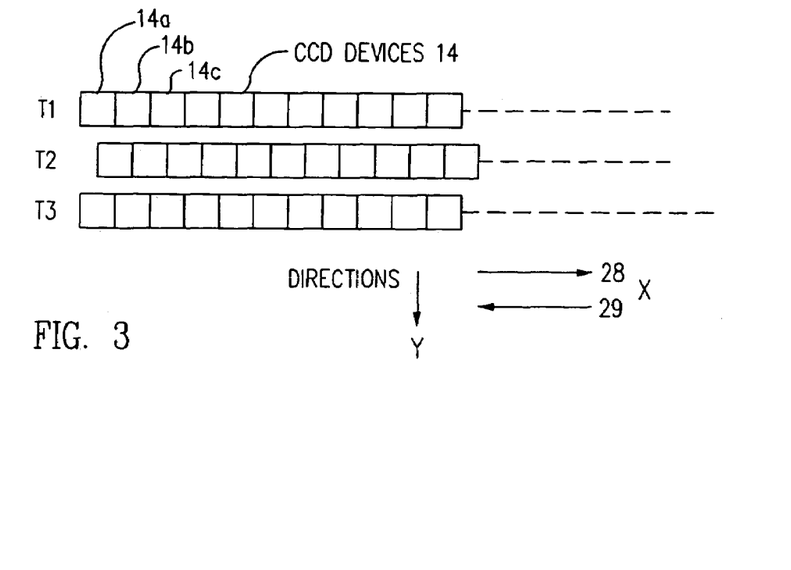
FIG. 3 shows the scanning array in a series of different positions.
Figure 3A:
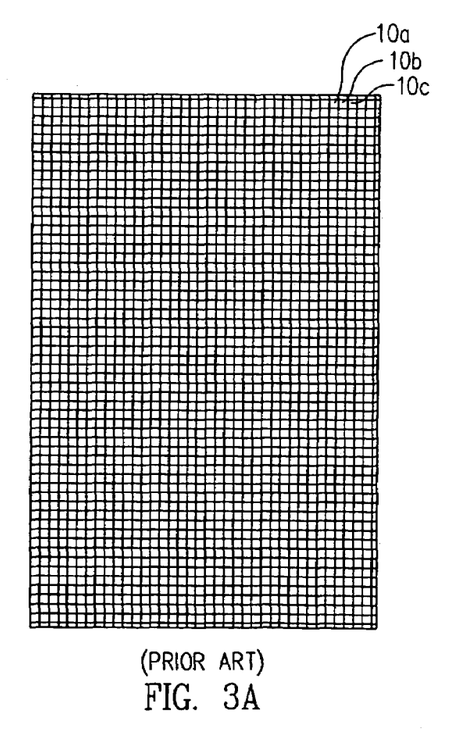
FIG. 3A illustrates the pattern of pixels created by a scanner which does not utilize the present invention.

FIG. 3A illustrates the image of document 10 which would be created in memory 20A if the system operated in a conventional manner without the present invention. The image has pixels 10a, 10b, 10c, etc. arranged in uniform rows and columns. The memory 20A stores a number for each pixel which indicates the intensity of that pixel. For completeness it is noted that a color scanner would store three numbers for each pixel to indicate the intensity of each of the tree primary colors in each pixel. The preferred embodiment of the invention will be described as a single color (i.e. a black and white) scanner. However, the invention can be extended to a color scanner by handling each color in the same manner that a single color is handled in the embodiment described herein.

The speed at which the array 14 is moved in the "y" direction and the rate at which the CCD devices 14 are read must be coordinated. For example in a scanner which is designed to create an image with 600 pixels per inch, if the time required for the array 14 to move 1/600th of an inch is one millisecond, a reading must be taken from the CCD elements in array 14 each millisecond. That is, the rate at which data is read from CCD devices in array 14 must be coordinated with the speed that the array 14 is moved in the any direction so that a new row of pixels is in position to be read each time the CCD elements in array 14 are read.

Figure 2A:
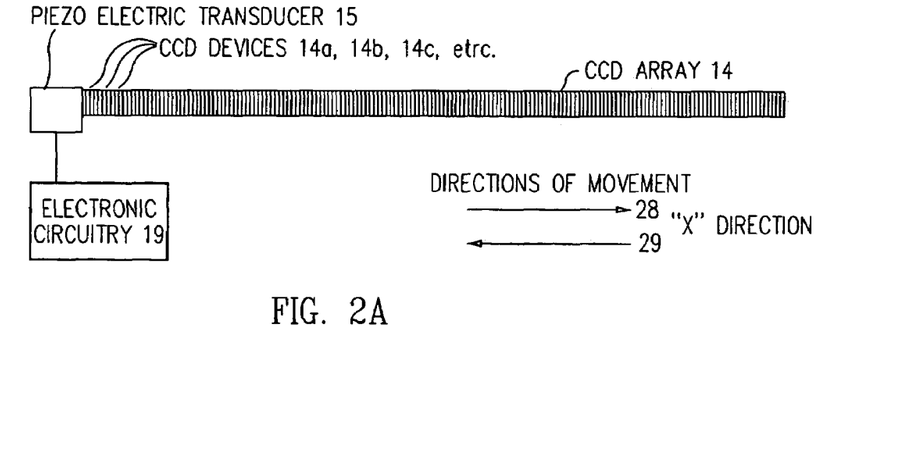
FIGS. 2A and 2B are diagrams showing how the CCD scanning array and the piezo electric transducer are mounted on the frame.
Figure 2B:
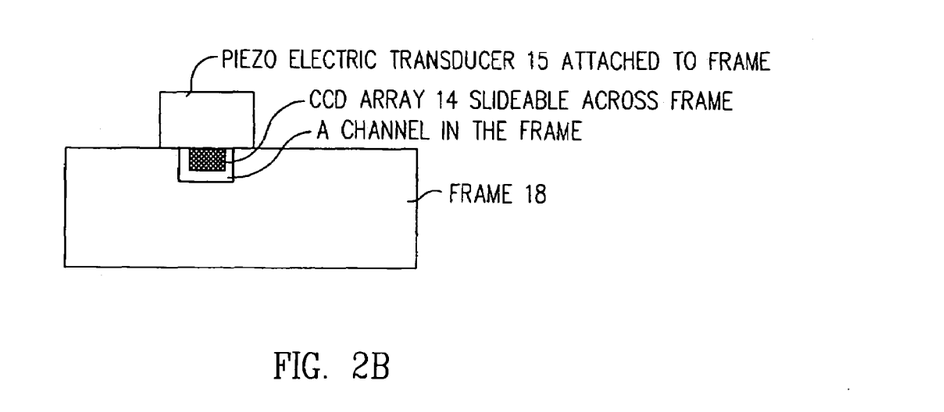

Scanners which produces the type of image illustrated in FIG. 3A are commercially available. The difference between the present invention and the prior art relates to the transducer unit 15 which moves or vibrates the array 14 in the "x" direction. As shown in FIG. 2 the CCD scanning array 14 has a large number individual CCD devices 14a, 14b, 14c etc. One end of the scanning array 14 is attached to transducer unit 15 which may be a piezo electric crystal. As shown in FIG. 2B, the piezo electric transducer 15 is attached to stationary frame 18. The array of CCD devices is free to move in the x direction (i.e. directions 28 and 29) by sliding in a channel or grove in frame 18. When a voltage is applied to piezo electric transducer 15 by electronic circuitry 19, the piezo electric transducer 15 expands and the CCD scanning array 14 moves in the direction 28. When the voltage is removed from the piezo electric transducer, the array 14 moves in direction 29 back to its original position.

In the first embodiment of the invention described herein the scanning array 14 is moved in the x direction (i.e. in directions 28 and 29) by an amount equal to one half a pixel size each time a row of pixels is read. The sequence of steps is:
a) The first row of pixels is read,
b) The scanning element is moved to the right (direction 28) by one half a pixel,
c) The second row of pixels is read,
d) The scanning element is moved to the left (direction 29) by one half a pixel, and
c) The second row of pixels is read.

The sequence is then repeated.

FIG. 3 shows the position of CCD scanning array 14 at three different times T1, T2, and T3. It is noted that in FIG. 3, the CCD devices 14a, 14b, 14c, etc. are shown in an expanded view and thus all of the elements in array 14 can not be shown on the figure. It should also be noted that the movement of the array 14 in the "y" direction along the document is in fact continuous and the positions discussed here are the positions of the array at the specific times that the CCD devices are sampled or read. At time T1, the scanning array 14 is in what will be called the "home" position. After the value is read from the CCD devices in the home position, the array 14 moves one pixel position in the "y" direction and the array 14 is moved one half a pixel position in the "x" direction 28. A second set of values is then read from the CCD devices 25 Next the array moves one more pixel position in the "y" direction and the array 14 is moved one half a pixel position back to the home position. The process is then repeated.

Figure 4:
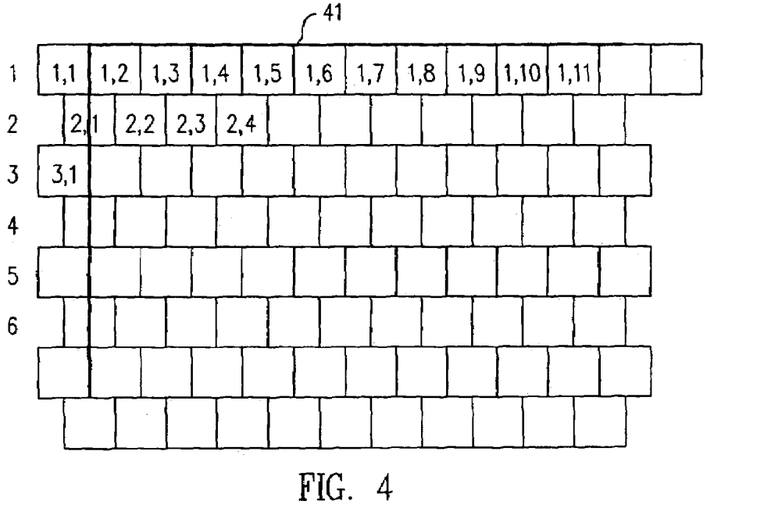
FIG. 4 shows the location on a document of the pixels from the scanning element.

FIG. 4 shows the document 11 with an indication of the location of the pixels that are read by CCD elements 14a, 14b, 14c, etc. It is noted that the edge portions of the document are ignored and only the information in the area designated by line 41 is of interest. It is also noted that since the document is shown enlarged in FIG. 4, only the top left corner of the document is shown.

The pixels in each row of the document are designated as by two numbers. The first number indicates the row where the pixel is located and the second number indicates the position of the pixel in the row. Thus the third pixel in the second row is designated as "2,3".

Figure 5:
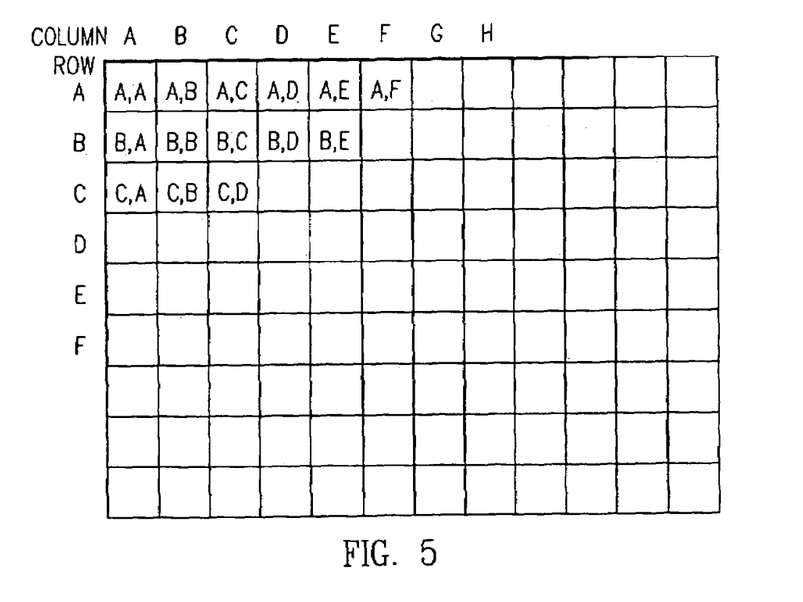
FIG. 5 shows how the data from the scanner is combined.

FIG. 5 illustrates the data in memory 17 which represents the data from area 41 of document 11. FIG. 5 represents an array of numbers stored in a memory in a conventional manner to represent an image. The images are arranged in rows and columns. Two letters are used to represent each number. For example "B,C" represents the third number in the second row. The number "B,C" is a number stored in memory 20A which represents the value of a particular pixel in the image.

The values represented in FIG. 5 are calculated from the values read from the CCD devices as they scan each of the pixels shown in FIG. 4. The values in the first row are the direct values read from the scanning elements. For example value "A,B" is the value read from a CCD element as it scans pixel "1,3" shown in FIG. 4. The values in row B are calculated values. For example value "B,A" is derived from the values read from the CCD elements as they scan pixels "2,1" and "2,2". The value of "B,A" is one half the value of "2,1" plus one half the value of "2,2". The reason for this is that the value "B,A" represents a pseudo pixel that is located half way between pixels "2,1" and "2,2". Each of the other values for the values in rows 2, 4, 6, etc. are calculated in like fashion.

From a physical point of view, a first set of values is read when the scanning array 14 is in position shown in T1 in FIG. 3. Next the array 14 is moved in the "y" direction by an amount equal to one pixel position and the scanning array 14 is moved one half a pixel position in the "x" direction 28 and a second set of values are read from the scanning array 14. The process then continues as previous explained. If the values read as described above were directly printed, on a conventional printer, the image would be distorted, since a printer prints the value of the pixels in the second row of an image directly beneath and aligned with the pixels in the first row of an image.

The above distortion which would occur due to the fact that the scanning array is moved between rows of pixels in an image is what necessitates the calculation of "pseudo" pixels as previously described.

In the simplified embodiment of the invention described above, the calculation of he value of the pseudo pixels is relatively easy since the scanning element is moved a uniform one half pixel amount between each scan row. In the preferred embodiment of the invention shown in FIG. 6 and described below, the calculation becomes somewhat more complicated.

Figure 6:
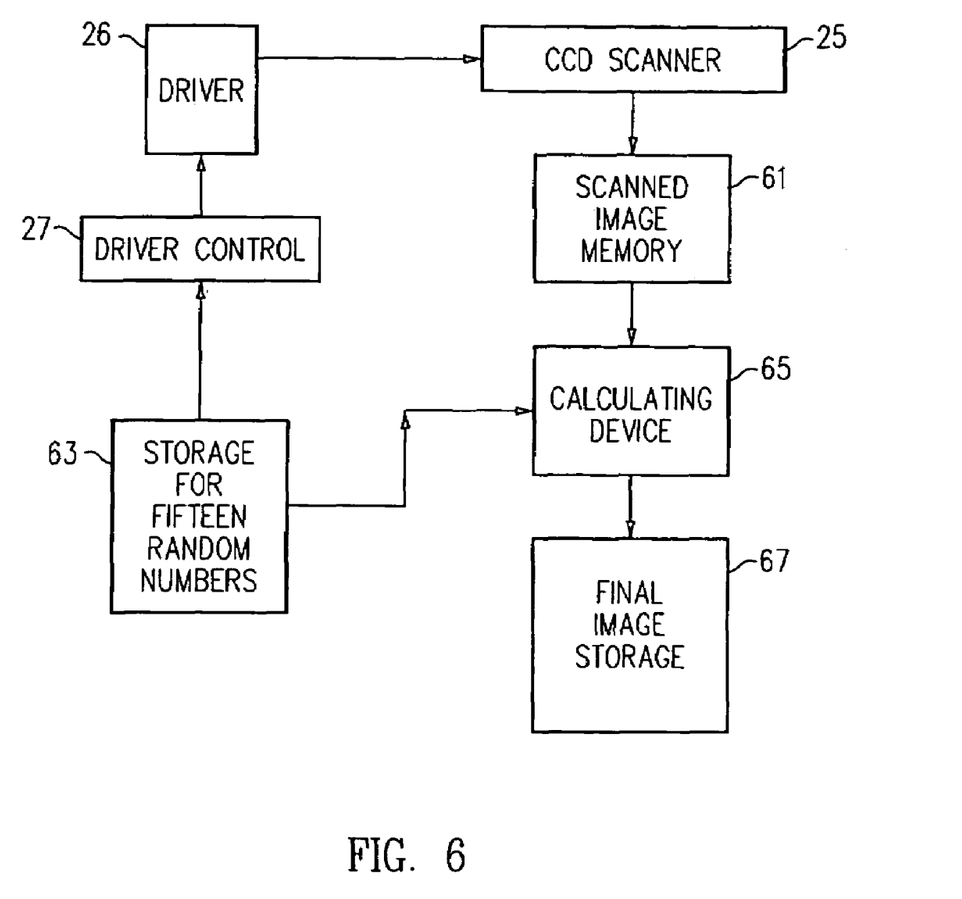
FIG. 6 shows a preferred embodiment of the invention.

In the preferred embodiment of the invention shown in FIG. 6, the scanning element 25 is moved in accordance with a pseudo random pattern. As shown in FIG. 6, the pseudo random pattern has fifteen different values between 10 and 90 percent. Each value represents the percent of the width of a pixel which the scanning element is moved during a particular time period. For example the scanner might be moved by the following amounts over fifteen rows of pixels:

| | |
|---|---|
| T1 | .27% of a pixel |
| T2 | .12% of a pixel |
| T3 | .60% of a pixel |
| T4 | .19% of a pixel |
| T5 | .15% of a pixel |
| T6 | .19% of a pixel |
| T7 | .22% of a pixel |
| T8 | .59% of a pixel |
| T9 | .00% of a pixel |
| T10 | .62% of a pixel |
| T11 | .25% of a pixel |
| T12 | .02% of a pixel |
| T13 | .39% of a pixel |
| T14 | .75% of a pixel |
| T15 | .78% of a pixel |

The above series of numbers is merely intended as an example. The mathematics for generating a series of pseudo random numbers is well developed. While in general the above numbers will provide satisfactory results, in various applications other series with more or less numbers and series generated with other random number generators may be better. The particular numbers used is a matter of choice for each particular application.

A system which utilizes a series of random numbers to determine the amount of movement between rows of pixels is shown in FIG. 6. The CCD scanner 25 and the driver 26 are similar to the previous embodiment. The series of numbers which specify the amount of movement are stored in memory 63. A driver control 27 reads the numbers from memory 63 and sequentially activates the driver 26 with signals which have a magnitude controlled by the numbers in storage 63. The output of the scanner goes to memory 61. The calculating device 65 combines the values from memory 61 into a final image based upon the amount of movement of each line.

In the previous example where the scanning element was moved one half of a pixel, the numbers in the final image was calculated by taking one half of the value of two pixels. In the situation described in the present embodiment the calculation is somewhat more complicated. For example is the movement is 0.25 of a pixel, the final value of a pixel would be calculated by taking 0.25% of the value of one value and 0.75% of another value.

The diagram shown in FIG. 6 shows a number of discrete components. it should be recognized that the components shown in FIG. 6, could be discrete components; however, they could also be subroutines and area of memory in a single conventional computer.

The present invention can also be used to enhance patterns which are intentionally places in an image. That is, the present invention can be utilized to detect special patterns which are placed in an image and which can only be detected by a scanner which operates according to the present invention As a simplified example consider an image which is printed at 1000 pixels per inch and which is scanned at 750 pixels per inch. Consider that the pixels in the image are printed in the pattern given below. In the following lines the numbers "9" and "6" indicate the intensity of a pixel. The underlining is only added to emphasize the pattern of the pixels.

69966996699669966996699669966996699669966996

69966996699669966996699669966996699669966996

69966996699669966996699669966996699669966996

With a conventional scanner, each scanned pixels would cover three of the original pixels and have one of the following values (where the numbers "24" and "21" indicate the values of the scanned pixels. The underlining shows the pixels in the original that are grouped together in the scanned pixels:

69966996699669966996699669966996699669966996
  24  21  21  24  24  21  21

69966996699669966996699669966996699669966996
  24  24  21  21  24  24

69966996699669966996699669966996699669966996
  21  24  24  21  21

The above shows each scanned lines. With a conventional scanner the lines which appear beneath each other would be as follows for each of the above examples:
21 21 24 24 21 21
21 21 24 24 21 21
21 21 24 24 21 21
21 21 24 24 21 21 or
24 24 21 21 24 24
24 24 21 21 24 24
24 24 21 21 24 24
24 24 21 21 24 24 or
21 24 24 21 21
21 24 24 21 21
21 24 24 21 21
21 24 24 21 21

With the present invention, where the scanner is shifted two pixels the right after the first row and then shifted back left after the second row, the patterns would be as follows:
24 21 21 24 24 21 21
24 24 21 21 24 24 21 21
24 21 21 24 24 21 21
24 24 21 21 24 24 21 21 or
24 24 21 21 24 24
21 24 24 21 21 24 24
24 24 21 21 24 24
21 24 24 21 21 24 24 or
21 24 24 21 21
21 21 24 24 21 21
21 24 24 21 21
21 21 24 24 21 21

As can be seen from the above only every third column has identical values in a vertical row, where with a conventional scanner, each vertical row was identical. When a printed image of the above is viewed, it would have a different appearance to the viewer.

It is noted that the above is a very simple example to illustrate the principle involved. The same principle could be used with a much more complicated pattern. Likewise the above illustration is given in terms of the first simplified embodiment of the invention. The same technique could be used with the preferred embodiment of the invention where the scanner is shifted in a more complicated pattern.

The above described technique can be used to facilitate the determination if documents are originals or copies. Using the above technique a pattern can be printed in a document which can only be detected by a scanner which has an array of elements that moves in a particular patterns. If such a document is scanned on a conventional scanner and then reproduced, the intensity of the hidden image will be reduced or destroyed.

The invention has been described with respect to single color black and white scanner. The invention could be similarly applied to a color scanner. A color scanner generally has three rows of detectors, one for each color. These detectors could all be moved together in the "x" direction or more complicated patterns could be created by moving the detectors for each pattern in accordance with a different pattern of movement.

It is noted that the present invention may not entirely eliminate Moiré patterns in all instances. However on a stochastic basis the present invention will minimize Moiré patterns in most conventional images.

In the embodiment described herein, the detector elements are moved in the "x" direction while the document is canned in the "y" direction. In certain applications it may be desirable to move the detector elements in a direction other than in the "x" direction.

The mechanism for moving array 14 in a "y" direction can be conventional. For example the array 14 could be mounted on rollers and spring biased to move in one "y" direction. An electric motor with a small cable could pull the array 14 against the spring bias in order to move the array over an document during the scanning operation.

The description and drawings from co-pending application Ser. No. 09/099,864 filed Jun. 18, 2001 are hereby incorporated herein by reference.

While the invention has been shown and described with respect to preferred embodiments thereof, it will be understood by those skilled in the art that various changes in form and detail may be make without departing from the sprit and scope of the invention.

I claim:

1. A method comprising the acts:
    acquiring scan data from an object using a multi-sensor scanning array, sensors in said array being fixedly spaced to define an optical scanning resolution;
    moving the array and the object relative to each other in a pattern that includes a pseudo-random component; and
    processing the scan data thereby acquired to yield output scan data having a resolution equal to the optical scanning resolution.

2. The method of claim 1 wherein a distance D separates first and second adjoining sensors in the scanning array, and the pseudo-random component of the motion traverses a distance not more than one-half D.

3. The method of claim 2, wherein said relative movement between the array and object is deliberately induced by operation of an electro-mechanical transducer.

4. The method of claim 3, wherein the array comprises plural rows of sensors.

5. The method of claim 1, wherein said relative movement between the array and object is deliberately induced by operation of an electro-mechanical transducer.

6. The method of claim 5, wherein the array comprises plural rows of sensors.

7. The method of claim 1, wherein the array comprises plural rows of sensors.

8. The method of claim 7, wherein a distance D separates first and second adjoining sensors in the scanning array, and the pseudo-random component of the motion traverses a distance not more than one-half D.

9. The method of claim 1 that includes:
    acquiring some of said scan data at a first time;
    acquiring some of said scan data at a second, later time; and
    combining scan data acquired at the first and second times to yield a frame of image data.

10. The method of claim 1 wherein said scan data is used to produce an image of the object that is enhanced compared to an image that would have been produced without said movement during scan data acquisition.

11. A method of producing scan data from an object using a multi-sensor scanning array, the array including plural sensor elements uniformly spaced along a line, said spacing defining an optical scanning resolution, the method characterized by combining signals from plural of said sensor elements in said line to yield a single datum in a set of output scan data, said output scan data having a resolution equal to the optical scanning resolution.

12. A method comprising the acts:
    producing scan data from an object using a multi-sensor scanning array, the array including plural sensor elements arranged in a line, a spacing between said elements defining an optical scanning resolution, said producing including:
    capturing scan data from all of the elements at a first sampling time, a first of said sensor elements capturing scan data from a first area of the object corresponding thereto at said first sampling time, and capturing scan data from all of said elements at a second, subsequent sampling time, a second of said sensor elements adjoining the first capturing scan data from an area that includes part of said first area during said second sampling time; and
    processing the captured scan data to yield output scan data having a resolution equal to the optical scanning resolution.

13. The method of claim 12 wherein, between the first and second sampling times, the array is shifted relative to the object in a direction not parallel to said line.

14. A device including:
    an array of photo sensors defining an optical resolution;
    a first set of memory locations in which is stored at least a first set of scan data acquired by said array at a first sampling time, and a second set of scan data acquired by said array at a second, subsequent, sampling time;
    a second set of memory locations in which is stored a set of seemingly random numbers that relate to locations of said array at said sampling times;
    wherein the seemingly random numbers are stored in the second set of memory locations before the first set of scan data is acquired.

15. The device of claim 14 in which said first set of memory locations further has stored therein a third set of scan data acquired by said array at a third sampling time after the second.

16. The device of claim 14 that further includes a calculating device having a first input for receiving scan data from the first set of memory locations, and a second input for receiving said seemingly random numbers from said another set of memory locations.

17. The device of claim 16 in which said calculating device operates on said scan data and seemingly random numbers to yield final image data at said optical resolution.

* * * * *

UNITED STATES PATENT AND TRADEMARK OFFICE
CERTIFICATE OF CORRECTION

| | | |
|---|---|---|
| PATENT NO. | : 7,656,565 B2 | Page 1 of 1 |
| APPLICATION NO. | : 10/678584 | |
| DATED | : February 2, 2010 | |
| INVENTOR(S) | : Rhoads | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1792 days.

Signed and Sealed this

Fifth Day of October, 2010

David J. Kappos
*Director of the United States Patent and Trademark Office*